US012625119B2

(12) United States Patent (10) Patent No.: US 12,625,119 B2
Chinomi et al. (45) Date of Patent: May 12, 2026

(54) TRAINING METHOD

(71) Applicant: Shimadzu Corporation, Kyoto (JP)

(72) Inventors: Kenta Chinomi, Kyoto (JP); Kaori Sugimura, Kyoto (JP); Shinji Kanazawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 466 days.

(21) Appl. No.: 18/121,109

(22) Filed: Mar. 14, 2023

(65) Prior Publication Data

US 2023/0296572 A1 Sep. 21, 2023

(30) Foreign Application Priority Data

Mar. 15, 2022 (JP) .................................. 2022-040403

(51) Int. Cl.
G06F 11/30 (2006.01)
G01N 30/86 (2006.01)

(52) U.S. Cl.
CPC ..... G01N 30/8696 (2013.01); G01N 30/8634 (2013.01)

(58) Field of Classification Search
CPC .................................................. G01N 30/8696
See application file for complete search history.

(56) References Cited

U.S. PATENT DOCUMENTS

2020/0261003 A1 8/2020 Bae et al.
2022/0128532 A1* 4/2022 Kanazawa ......... G01N 30/8689

FOREIGN PATENT DOCUMENTS

| CN | 110554791 A | 12/2019 |
|---|---|---|
| CN | 111312272 A | 6/2020 |
| EP | 433626 A2 | 6/1991 |
| JP | 2000-131284 A | 5/2000 |
| JP | WO2012073322 A1 | 6/2012 |
| WO | 2018134952 A1 | 7/2018 |
| WO | 2020/070786 A1 | 4/2020 |
| WO | 2020105566 A1 | 5/2020 |

(Continued)

OTHER PUBLICATIONS

"LabSolutions InsightTM Optional Software PeakintelligenceTM", [Online], [Searched on Dec. 2, 2019], Shimadzu Corporation (https://www.an.shimadzu.co.jp/lcms/m_package/peakintelligence.htm) with machine translation.

(Continued)

*Primary Examiner* — Phuong Huynh
(74) *Attorney, Agent, or Firm* — Muir Patent Law, PLLC

(57) ABSTRACT

A training method includes: acquiring a pseudo noise waveform indicating an assumed noise; acquiring a pseudo peak waveform not including the pseudo noise; generating a pseudo signal waveform by adding the pseudo noise waveform and the pseudo peak waveform; and updating an estimation model based on the pseudo signal waveform, in which the acquiring the pseudo noise waveform includes: causing an analysis device to execute noise measurement generating the pseudo noise waveform a plurality of times; calculating a similarity degree of a plurality of pseudo noise waveforms generated by the noise measurement performed the plurality of times; and executing prescribed processing according to the similarity degree.

8 Claims, 13 Drawing Sheets

(56)          References Cited

FOREIGN PATENT DOCUMENTS

WO      WO-2021261202 A1 * 12/2021   ............. G06N 20/00

OTHER PUBLICATIONS

Goodfellow et al, "Generative Adversarial Nets", Jun. 10, 2014 (https://arxiv.org/pdf/1406.2661.pdf).
Radford et al, "Unsupervised Representation Learning with Deep Convolutional Generative Adversarial Networks", Jan. 7, 2016 (https://arxiv.org/abs/1511.06434).
Notice of Reasons for Refusal dated Oct. 14, 2025 for corresponding Japanese Patent Application No. 2022-040403.
Office Action dated Sep. 18, 2025 for corresponding Chinese Patent Application No. 202310234915.8.
Zhai Shang et al., "Microseismic Monitoring Events Classification Based on Waveform Clustering Analysis and Application," Acta Scientiarum Naturalium Universitatis Pekinensis, vol. 56, No. 3 (May 2020), pp. 406 416.
Office action dated Apr. 1, 2026 for corresponding application No. CN 202310234915.8.

* cited by examiner

FIG.2

TRAINING DEVICE

PROCESSING OF S2

START

S20
PERFORM BLANK MEASUREMENT N TIMES

S22
CALCULATE CORRELATION COEFFICIENT
OF EACH OF N BLANK CHROMATOGRAMS

S24
CALCULATE AVERAGE VALUE OF
N CORRELATION COEFFICIENTS

S26
AVERAGE VALUE < THRESHOLD?

NO

YES

S28
ACQUIRE N BLANK CHROMATOGRAMS
AS PSEUDO NOISE

S30
DISCARD
N BLANK CHROMATOGRAMS

END

PROCESSING OF S2 (SECOND EMBODIMENT)

START

S42
PERFORM SAMPLE MEASUREMENT N TIMES

S44
CALCULATE CORRELATION COEFFICIENT OF
N CHROMATOGRAMS IN NON-PEAK SECTION

S24
CALCULATE AVERAGE VALUE OF
N CORRELATION COEFFICIENTS

S26
AVERAGE VALUE < THRESHOLD?

NO

YES

S28A
ACQUIRE N CHROMATOGRAMS
AS PSEUDO NOISE

S30A
DISCARD
N CHROMATOGRAMS

END

AVERAGE VALUE OF CORRELATION
COEFFICIENT IS GREATER THAN OR
EQUAL TO THRESHOLD.

TRAINING METHOD

BACKGROUND OF THE INVENTION

Field of the Invention

The present disclosure relates to a training method.

Description of the Background Art

WO 2020/070786 discloses a chromatographic system. This chromatographic system separates and detects a peak of an unseparated peak of a chromatogram by artificial intelligence (AI) using an estimation model. The chromatographic system performs qualitative analysis or quantitative analysis of a sample based on the peak.

WO 2020/070786 discloses that a computer executes training updating an estimation model. This computer acquires a plurality of chromatograms each of which has a peak, and prepares the chromatogram of the unseparated peak by adding the plurality of chromatograms. The computer updates an estimation model using the plurality of chromatograms as training data and using the prepared chromatogram as training data.

SUMMARY OF THE INVENTION

Generally, in an analysis device such as a chromatograph, a signal waveform (for example, the chromatogram) including a noise waveform of noise that can be generated when a sample is analyzed is sometimes generated. WO 2020/070786 does not disclose training in which the noise waveform is reflected.

The present disclosure has been made to solve such a problem, and an object of the present disclosure is to perform training reflecting the noise waveform that can be generated when the analysis device analyzes the sample.

A training method of the present disclosure is a training method for training an estimation model used to detect a peak of a signal waveform output by an analysis device that analyzes a sample. The training method includes acquiring a noise waveform that may be generated when an analysis device executes analysis processing and training the estimation model based on the noise waveform. The acquiring the noise waveform includes: acquiring a plurality of noise waveforms by noise measurement executed a plurality of times by the analysis device; calculating a similarity degree of the plurality of noise waveforms; and executing prescribed processing according to the similarity degree.

A training program of the present disclosure is a training program that causes a computer to update an estimation model used to detect a peak of a signal waveform output by an analysis device that analyzes a sample. The training program causes a computer to execute acquiring a noise waveform that may be generated when an analysis device executes analysis processing and training an estimation model based on the noise waveform. The acquiring the noise waveform includes: acquiring a plurality of noise waveforms by noise measurement executed a plurality of times by the analysis device; calculating a similarity degree of the plurality of noise waveforms; and executing prescribed processing according to the similarity degree.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram illustrating a hardware configuration of a training device 30.

FIG. 13 illustrates an example of a prescribed image.

DESCRIPTION OF THE PREFERRED EMBODIMENTS

Figure 1:
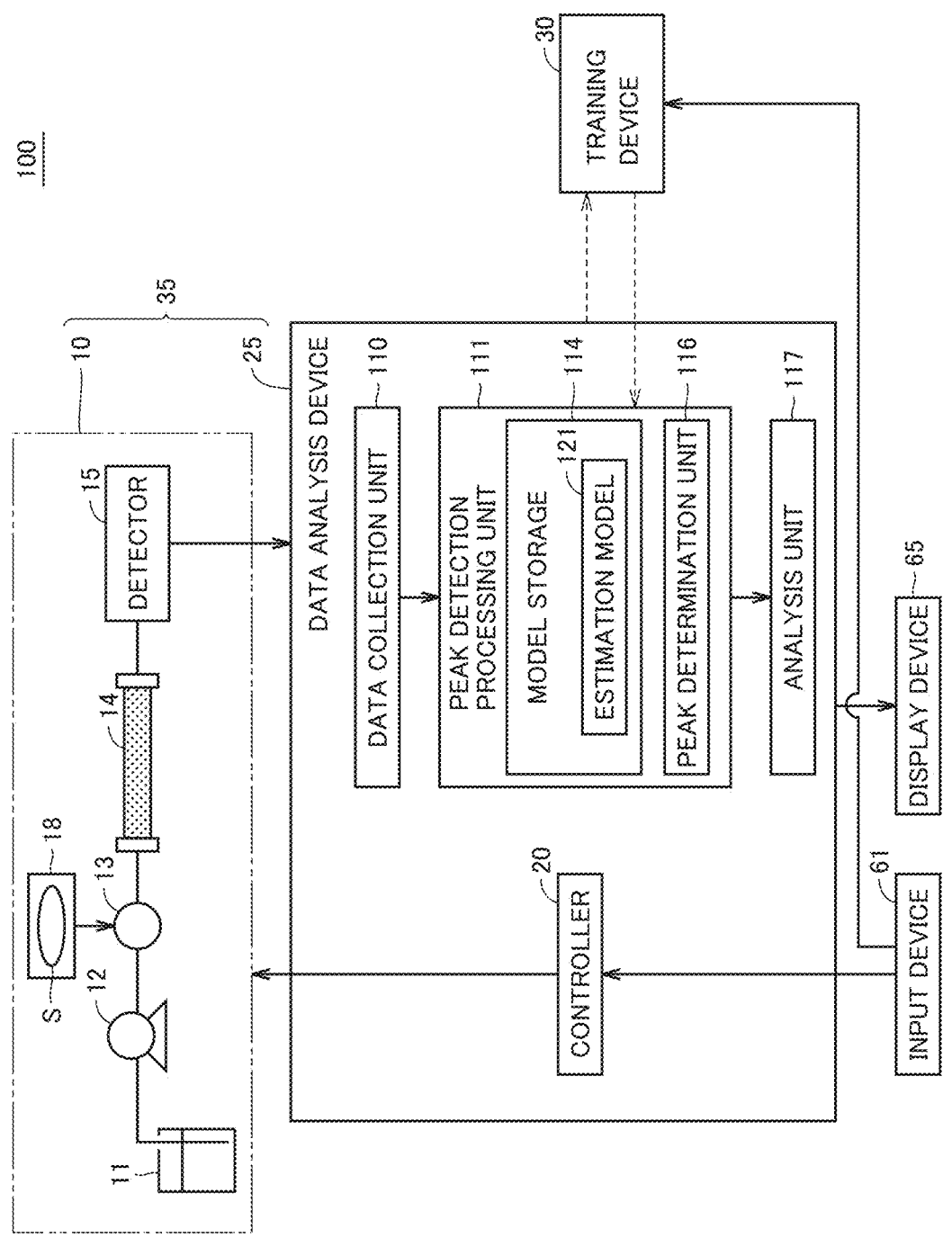
FIG. 1 is a view illustrating a configuration example of an analysis system.

Hereinafter, embodiments of the present invention will be described in detail with reference to the drawings. In the drawings, the same or corresponding part is denoted by the same reference numeral, and the description thereof will not be repeated.

First Embodiment (Analysis System)

The present disclosure relates to a training technique for updating an estimation model used to detect a peak of a signal waveform output by an analysis device. Examples of the analysis device include a gas chromatograph (GC) device, a liquid chromatography (LC) device, a mass spectrometer, a spectrophotometer, and an X-ray analyzer.

For example, the signal waveform may be a chromatogram waveform or a mass spectrum waveform. When the analysis device is the spectrophotometer, the signal waveform is an absorption spectrum waveform. When the analysis device is the X-ray analyzer, the signal waveform is an X-ray spectrum waveform.

Furthermore, training (training processing) of an estimation model (estimation model 121 described later) includes processing for newly generating (constructing) an unconstructed estimation model and processing for updating an already constructed estimation model. "Updating the estimation model" includes processing for updating a parameter of the estimation model. Furthermore, the estimation model updated (optimized) by the training processing is also referred to as a "trained model". The pre-training estimation model and the trained estimation model are collectively referred to as an "estimation model". Hereinafter, an "example in which the training of the estimation model is update of the estimation model" will be mainly described.

In the first embodiment, an analysis system in which a liquid chromatograph is adopted will be described. FIG. 1 is a view illustrating a configuration example of an analysis system 100. Analysis system 100 includes an analysis device 35, an input device 61, a display device 65, and a training device 30. Analysis device 35 includes a measurement unit 10 and a data analysis device 25. For example, data analysis device 25 and training device 30 include an information processing device (for example, a personal computer (PC)). In the example of FIG. 1, data analysis device 25 and training device 30 are individually illustrated, but may be integrated. Training device 30 corresponds to the "computer" of the present disclosure.

Input device 61 is a pointing device such as a keyboard or a mouse, and receives an instruction from a user. For example, display device 65 includes a liquid crystal display (LCD) panel. Display device 65 displays various images. When a touch panel is used as a user interface, input device 61 and display device 65 are integrally formed. Input device 61 is connected to data analysis device 25 and training device 30. Display device 65 is connected to data analysis device 25.

Data analysis device 25 includes a controller 20. Controller 20 controls measurement unit 10. Measurement unit 10 includes a mobile phase container 11, a pump 12, an injector 13, a column 14, a detector 15, and a disposition unit 18. A sample S of an analysis target is disposed in disposition unit 18. Sample S becomes a sample liquid by being dissolved in a prescribed solvent. Mobile phase container 11 stores a mobile phase. Pump 12 sucks the mobile phase stored in mobile phase container 11 and feeds the mobile phase to column 14 at a substantially constant flow speed (or flow rate).

Injector 13 injects a prescribed amount of sample liquid into the mobile phase at prescribed timing according to an instruction from controller 20. The injected sample solution is introduced into column 14 along the flow of the mobile phase. Various compounds contained in the sample solution are separated and eluted in a time direction while passing through column 14. That is, column 14 separates compounds contained in the sample liquid according to a retention time.

Detector 15 detects compounds in an eluent eluted from column 14. Detector 15 outputs a detection signal having intensity corresponding to a compound amount to data analysis device 25. For example, an optical detector or the like adopting a photodiode array (PDA) detector or the like is used as detector 15.

In addition to controller 20, data analysis device 25 includes a data collection unit 110, a peak detection processing unit 111, and an analysis unit 117.

Data collection unit 110 samples the detection signal output from detector 15 at prescribed time intervals, and converts the detection signal into digital data. Data collecting unit 110 stores the digital data in a prescribed storage region (not illustrated). The digital data is data (hereinafter, also referred to as "chromatogram data") indicating the chromatogram waveform.

Peak detection processing unit 111 estimates (derives) the peak of the chromatogram by the chromatogram data collected by data collection unit 110 using artificial intelligence (AI).

In the first embodiment, peak detection processing unit 111 includes a model storage 114 and a peak determination unit 116. For example, model storage 114 stores an estimation model 121 (neural network) generated by machine learning. For example, estimation model 121 is expressed by a prescribed function. For example, the prescribed function is an exponentially modified gaussian (EMG) function.

Peak determination unit 116 inputs the chromatogram based on the chromatogram data collected by data collection unit 110 to estimation model 121. Estimation model 121 outputs the peak of the chromatogram. As described above, peak detection processing unit 111 estimates the peak of the chromatogram by the chromatogram data collected by data collection unit 110, and outputs the peak to analysis unit 117.

The time at which the peak is observed (retention time) corresponds to the type of the compound. The chromatogram is transmitted to the data analysis device. The data analysis device specifies the compound from the retention time of the peak included in the chromatogram. This identification is also referred to as "qualitative analysis".

A height of the peak and an area of the peak in the chromatogram correspond to a concentration or a content of the compound in the sample. The data analysis device specifies the concentration and content of the compound of the sample from the height or area value of the peak included in the chromatogram. This identification is also referred to as "quantitative analysis".

In the peak output from peak determination unit 116, analysis unit 117 obtains a position (time) of the peak top of the peak and an area value (or height) of the peak. Analysis unit 117 specifies the compound from information about the position of each peak on the chromatogram. In addition, analysis unit 117 calculates the content of each compound from the peak area value (or the height value) using a previously-prepared calibration curve. In this manner, analysis unit 117 executes qualitative analysis and quantitative analysis of each compound contained in the sample. Analysis unit 117 displays a qualitative analysis result and a quantitative analysis result on display device 65.

Furthermore, training device 30 updates estimation model 121 (executes training of estimation model 121) as described later. When the user executes a prescribed operation on input device 61, the mode of analysis system 100 is switched to the training mode. Training device 30 updates estimation model 121 during the training mode.

[Hardware Configuration of Training Device]

Figure 2:
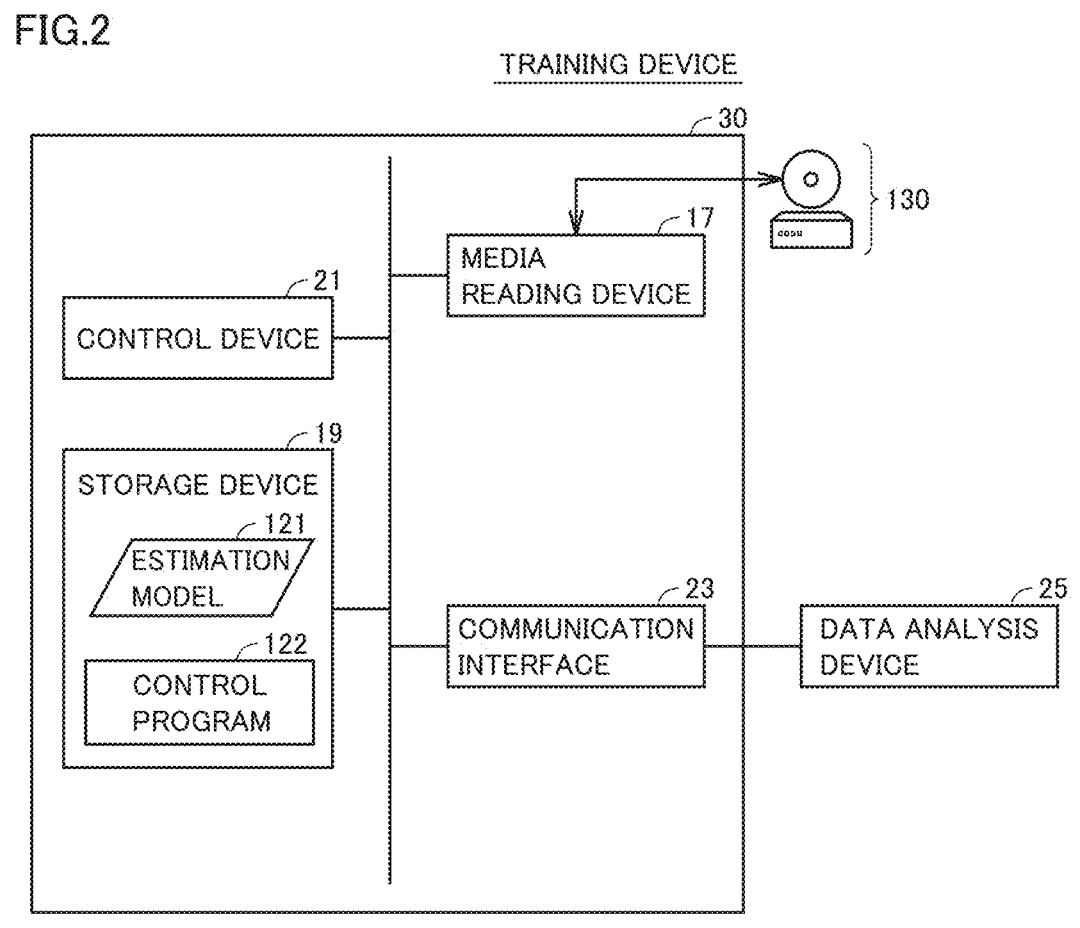

FIG. 2 is a block diagram illustrating a hardware configuration of training device 30 of the first embodiment. As illustrated in FIG. 2, training device 30 includes a controller 21, a storage device 19, a media reading device 17, and a communication interface 23 as main hardware elements.

Controller 21 updates estimation model 121 as described later. For example, controller 21 includes a central processing unit (CPU), a field programmable gate array (FPGA), and a graphics processing unit (GPU). Controller 21 may include at least one of the CPU, the FPGA, and the GPU, or may include the CPU and the FPGA, the FPGA and the GPU, the CPU and the GPU, or all of the CPU, the FPGA, and the GPU. Controller 21 may be configured by an arithmetic circuit (processing circuitry).

Storage device 19 includes a volatile storage region (for example, working area) that temporarily stores a program code, a work memory, and the like when controller 21 executes an arbitrary program. For example, storage device 19 is constructed with a volatile memory device such as a dynamic random access memory (DRAM) or a static random access memory (SRAM). Furthermore, storage device 19 includes a nonvolatile storage region. For example, storage device 19 includes a nonvolatile memory device such as a hard disk or a solid state drive (SSD).

In the first embodiment, the example in which the volatile storage region and the nonvolatile storage region are included in the same storage device 19 has been described. However, the volatile storage region and the nonvolatile storage region may be included in different storage devices. For example, controller 21 may include the volatile storage region, and storage device 19 may include the nonvolatile storage region. Training device 30 may include a microcomputer including controller 21 and storage device 19.

Storage device 19 stores estimation model 121 and a control program 122. Estimation model 121 includes a neural network and parameters used in processing in the neural network.

Estimation model 121 includes at least a program capable of the machine learning, and the parameter is optimized (adjustment, update) by performing the machine learning based on data for training (training data). Training device 30 transmits the optimized estimation model (estimation model 121A in FIG. 7) to data analysis device 25. Data analysis device 25 updates estimation model 121 stored in model storage 114 to transmitted estimation model 121A (optimized estimation model). As described above, peak detection processing unit 111 can improve estimation accuracy of the peak by estimating the peak using updated estimation model 121.

The processing for updating the parameter of estimation model 121 is also referred to as "training processing". Estimation model 121 optimized by the training processing is also referred to as a "trained model". In the first embodiment, pre-training estimation model 121 and trained estimation model 121 are collectively referred to as an "estimation model". In particular, trained estimation model 121 is also referred to as a "trained model". Control program 122 is a program executed by controller 21.

Medium reading device 17 receives recording medium 130 such as a removable disk, and acquires the data stored in recording medium 130. For example, the data is the control program. Furthermore, control program 122 may be stored in recording medium 130 (for example, a removable disk) and distributed as a program product. Alternatively, control program 122 may be provided as the program product that can be downloaded by an information provider through the Internet or the like. Controller 21 reads the program provided by recording medium 130, the Internet, or the like. Controller 21 stores the read program in a prescribed storage region (storage region of storage device 19). Controller 21 executes the training processing described later by executing stored control program 122.

The recording medium 130 is not limited to a digital versatile disk read only memory (DVD-ROM), a compact disc read-only memory (CD-ROM), a flexible disk (FD), or a hard disk, but may be a medium that fixedly carries a program, such as a magnetic tape, a cassette tape, an optical disk (magnetic optical disc (MO)/mini disc (MD)/digital versatile disc (DVD)), an optical card, and a semiconductor memory such as a mask ROM, an erasable programmable read-only memory (EPROM), an electrically erasable programmable read-only memory (EEPROM), or a flash ROM. Recording medium 130 is a non-transitory medium in which control program 122 or the like can be read by the computer.

Communication interface 23 is an interface connecting data analysis device 25, and implements input and output of the data between training device 30 and data analysis device 25. In the first embodiment, training device 30 acquires actually-measured chromatogram data and blank chromatogram data that are transmitted from data analysis device 25 through communication interface 23. Hereinafter, the actually-measured chromatogram data and the blank chromatogram data are collectively referred to as chromatogram data. In addition, training device 30 transmits updated estimation model 121 to data analysis device 25 through communication interface 23.

[Pseudo Chromatogram]

Figure 3:
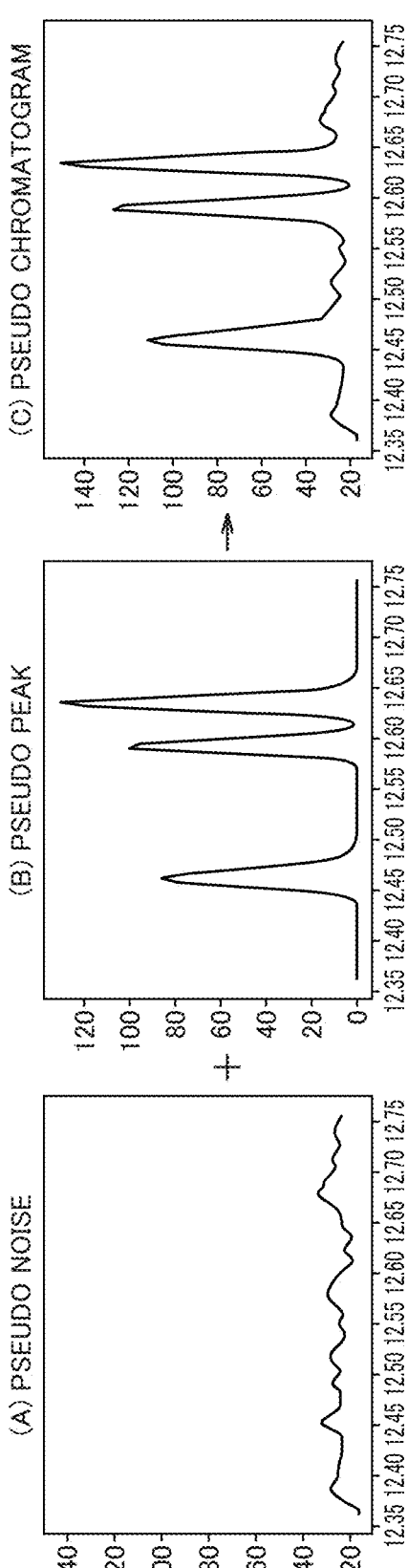
FIG. 3 is a view illustrating pseudo chromatogram.

Pseudo chromatogram will be described below. The pseudo chromatogram is information used by training device 30 to update estimation model 121. FIG. 3 is a view illustrating the pseudo chromatogram. In the chromatograms of FIGS. 3(A) to 3(C), a vertical axis represents signal intensity, and a horizontal axis represents time (retention time).

FIG. 3(A) is a view illustrating an example of pseudo noise. The pseudo noise is noise simulating assumed noise. The assumed noise is noise that can be generated (assumed to be generated) when analysis device 35 analyzes sample S. A cause of the assumed noise is mixing of a foreign compound in column 14, base line drift, or the like. There is at least one type of assumed noise. In the first embodiment, the pseudo noise is generated by analysis device 35 performing the blank measurement.

At this point, the blank measurement is processing performed by analysis device 35 executing analysis processing while sample S is not disposed in disposition unit 18. For example, the blank measurement includes the following first blank measurement, second blank measurement, third blank measurement, and fourth blank measurement.

For example, the first blank measurement is processing for analyzing only the carrier gas while sample S is not disposed in disposition unit 18 while analysis device 35 is constructed with a gas chromatograph.

The second blank measurement is processing for generating a first pseudo sample constructed with only a solvent without adding a reagent (for example, a conductive reagent) and the sample and analyzing the first pseudo sample. The third blank measurement is processing for preparing a second pseudo sample including only the reagent and the solvent without adding the sample and analyzing the pseudo sample.

In the fourth blank measurement, a pre-processing performed in analyzing the sample is used. The fourth blank measurement is processing for performing the same pre-processing as the pre-processing described above on any one of the carrier gas, the first simulated sample, and the second simulated sample, and analyzing the substance after the pre-processing is performed.

Further, in the first to fourth blank measurements, a frequency of generation of contamination is high in the order of the fourth blank measurement, the third blank measurement, the second blank measurement, and the first blank measurement, and the noise intensity increases. That is, the noise intensity that can be generated in the fourth blank measurement is the highest, and the noise intensity that can be generated in the first blank measurement is the lowest.

In the first embodiment, the blank chromatogram is generated by measurement unit 10 executing the blank measurement N times (N is an integer of at least 2). The blank chromatogram corresponds to the pseudo noise. The pseudo noise corresponds to the "noise waveform" of the present disclosure. As described above, because the blank measurement is a measurement generating the pseudo noise, the blank measurement is also referred to as "noise measurement".

FIG. 3(B) is a view illustrating an example of a pseudo peak. The pseudo peak is a waveform simulating the peak of the chromatogram. The pseudo peak does not include the noise and includes the peak and a baseline. As will be described later, the pseudo peak is information generated by analysis device 35 analyzing sample S.

FIG. 3(C) is a view illustrating an example of a pseudo chromatogram. Training device 30 generates the pseudo chromatogram by adding the pseudo noise and the pseudo peak. Then, training device 30 updates estimation model 121 based on the generated pseudo chromatogram. Specifically, training device 30 updates estimation model 121 using the pseudo chromatogram as the training data and the pseudo peak as the training data.

In addition, measurement unit 10 newly analyzes the unknown sample to generate the chromatogram. In this analysis, the assumed noise is sometimes included in the detection signal of detector 15. In this case, the chromatogram including the noise in the baseline is generated.

Data analysis device 25 detects the peak by inputting chromatogram data including the assumed noise to updated estimation model 121. At this point, in estimation model 121, the training is performed using the pseudo chromatogram as the training data and the pseudo peak as the training data as described above. Therefore, data analysis device 25 can appropriately detect the chromatogram excluding the assumed noise, namely, the peak using estimation model 121. As described above, even when the chromatogram including the assumed noise is generated when an unknown sample is newly analyzed, the accuracy of the peak detection can be improved using estimation model 121. Furthermore, training device 30 can train the estimation model in the same situation (situation in which the signal waveform is generated) as the situation generated in the case of analyzing the unknown sample.

Furthermore, training device 30 may update estimation model 121 using the pseudo noise as the training data without including the pseudo peak. That is, the training data (training data set) includes at least one of the first pseudo chromatogram including the pseudo peak and the second pseudo chromatogram not including the pseudo peak. For example, the first pseudo chromatogram is pseudo chromatogram in which the pseudo peak and the pseudo noise are added. For example, the second pseudo chromatogram is a pseudo chromatogram constructed with the pseudo noise without including the pseudo peak.

[Non-Assumed Noise]

Non-assumed noise will be described below. As described above, the pseudo noise is generated by performing the blank measurement. However, the pseudo noise may include non-assumed noise. The non-assumed noise is noise that cannot be included when measurement unit 10 performs the analysis. Accordingly, when training device 30 updates estimation model 121 using the pseudo noise including the non-assumed noise, the accuracy of the peak detection using estimation model 121 decreases (the quality of the estimation model decreases). The non-assumed noise is also referred to as "unintended noise".

Here, the reason why the non-assumed noise can be included will be described. For example, at the time of the blank measurement, a non-assumed foreign substance is sometimes mixed in any component or solvent of the measurement unit 10. For example, the component is pump 12. When the blank measurement is executed while such foreign matter is mixed, the peak (non-assumed noise) caused by the foreign matter is included in the pseudo noise.

For example, when the measurement unit 10 is constructed with the gas chromatograph, and when the unknown sample is analyzed, the unknown sample is derivatized with a derivatization reagent. When measurement unit 10 is constructed with the gas chromatograph, sample S is disposed in disposition unit 18, and the blank measurement is performed using the derivatization reagent. Consequently, the peak (non-assumed noise) derived from the derivatization reagent is included in the pseudo noise by the blank measurement.

Accordingly, in the first embodiment, training device 30 determines whether the non-assumed noise is included in the pseudo noise based on a correlation coefficient of each of the N blank chromatograms. When it is determined that the non-assumed noise is included, estimation model 121 is updated while excluding the pseudo noise including the non-assumed noise. As a result, the accuracy of the peak detection using estimation model 121 can be improved.

Figure 4:
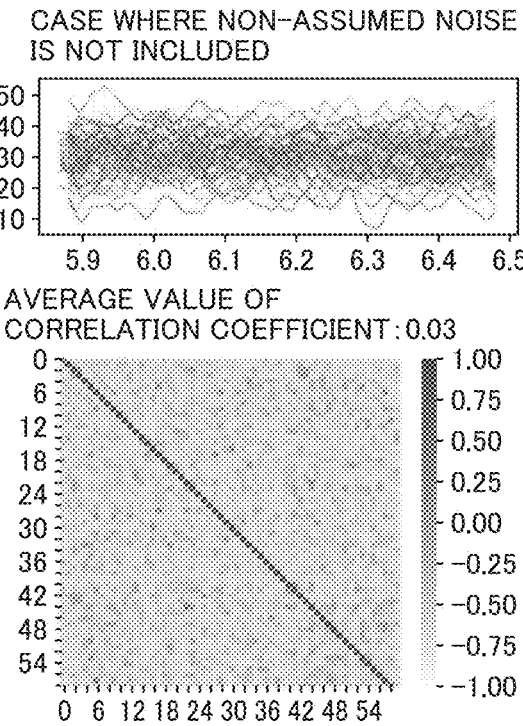
FIG. 4 illustrates an example of blank chromatogram that does not include a non-assumed noise.
Figure 5:
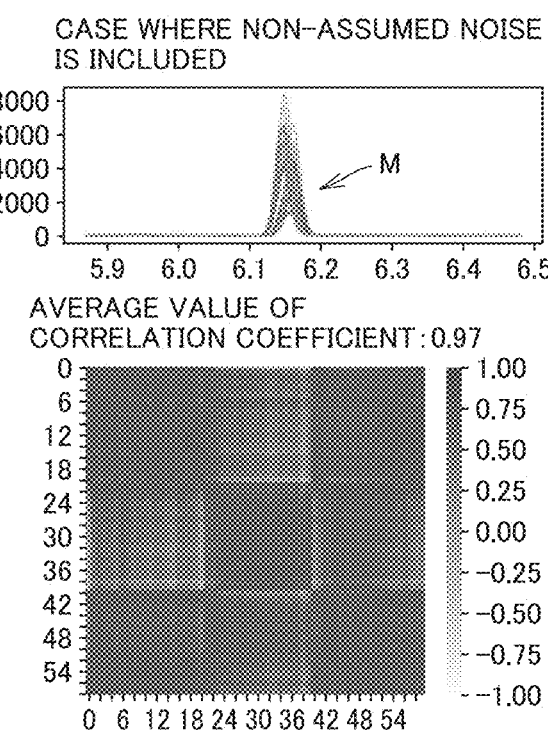
FIG. 5 illustrates an example of the blank chromatogram including a non-assumed noise M.

FIGS. 4 and 5 are examples of the blank chromatograms generated by performing the blank measurement 60 times (=N). FIG. 4 illustrates the example of the blank chromatogram (pseudo noise) not including the non-assumed noise. FIG. 5 illustrates the example of the blank chromatogram (pseudo noise) including non-assumed noise M.

When the non-assumed noise is not included as illustrated in an upper part of FIG. 4, a phenomenon in which the assumed noise different every time is included in the blank chromatogram may be generated by N-time blank measurements. In view of this phenomenon, a correlation coefficient between chromatogram Bn (n=1, . . . , N) of one of the N blank chromatograms and another chromatogram Bm (m=1, . . . , N) different from the chromatogram Bn is low. Note that m and n are different (m≠n).

Therefore, training device 30 calculates L correlation coefficients between the chromatogram Bn of 1 and the other chromatograms Bm. Note that $L=_N C_2$. Training device 30 calculates an average value or a total value of the L correlation coefficients. In the first embodiment, training device 30 calculates the average value of the L correlation coefficients. Then, when the average value is less than a predetermined threshold, it is determined that the blank chromatogram does not contain the non-assumed noise.

A lower part of FIG. 4 is a view illustrating an example of a heat map of the L correlation coefficients. The vertical axis of the heat map indicates the chromatogram Bn of 1, and the horizontal axis indicates another chromatogram Bm. When the non-assumed noise is not included in the pseudo noise as illustrated in the lower part of FIG. 4, the correlation coefficient is low as a whole. In the example in the lower part of FIG. 4, the average value of the L correlation coefficients is 0.03. The correlation coefficient corresponds to the "similarity degree" of the present disclosure. The similarity degree is a value indicating a degree of similarity between the chromatogram Bn of one of the N chromatograms and the other chromatograms Bm. In the first embodiment, the similarity degree (correlation coefficient) increases as the chromatogram Bn of one is more similar to the other chromatograms Bm. As a modification, the similarity degree that becomes smaller as the chromatogram Bn of one is more similar to the other chromatograms Bm may be adopted. The similarity degree may be another parameter, for example, a distance (for example, Frechet distance) between the chromatogram Bn of 1 and another chromatogram Bm.

On the other hand, when the non-assumed noise is included as illustrated in the upper part of FIG. 5, the peak may be generated in the same retention time period in any of the N blank measurements. In the upper part of FIG. 5, the peak is generated as the non-assumed noise M. Accordingly, the average value of the L correlation coefficients increases. Consequently, when the average value of the L correlation coefficients is greater than or equal to the threshold, training device 30 determines that the blank chromatogram includes the non-assumed noise.

The lower part of FIG. 5 is a view illustrating an example of the heat map of the L correlation coefficients. When the non-assumed noise is included in the pseudo noise as illustrated in the lower part of FIG. 5, the correlation coefficient becomes high as a whole. In the example in the lower part of FIG. 5, the average value of the L correlation coefficients is 0.97.

[Functional Block of Training Device]

Figure 6:
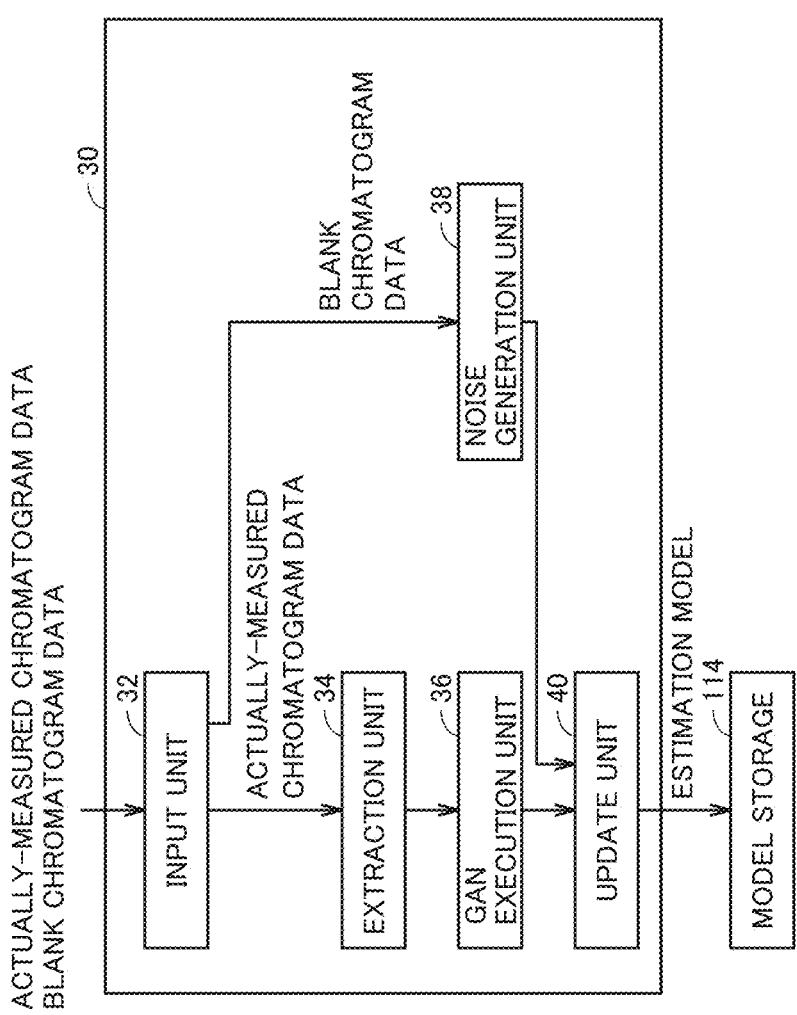
FIG. 6 is a functional block diagram illustrating a training device.

FIG. 6 is a functional block diagram illustrating training device 30. Training device 30 includes an input unit 32, an extraction unit 34, a GAN execution unit 36, a noise generation unit 38, and an update unit 40. Training device 30 is a device that updates estimation model 121 in the training mode. When the user performs a prescribed operation on input device 61, the mode of analysis system 100 is shifted to the training mode.

The actually-measured chromatogram data and the blank chromatogram data are input to input unit 32. The actually-measured chromatogram data is data obtained by measurement unit 10 measuring the sample set in disposition unit 18. The sample may be the unknown sample in which the compound is unknown or the known sample in which the compound is known. The blank chromatogram data is data obtained by the measurement using measurement unit 10 while the sample is not set in disposition unit 18. As a modification, at least one of the actually-measured chromatogram data and the blank chromatogram data may be generated by a device equivalent to measurement unit 10.

The actually-measured chromatogram data is input to extraction unit 34, and the blank chromatogram data is input to noise generation unit 38. A flag is provided in the chromatogram data. This flag is information determining whether the data is the actually-measured chromatogram data or the blank chromatogram data. An actual-measured flag indicating the actual-measured chromatogram data is given to the actual-measured chromatogram data. A blank flag indicating the blank chromatogram data is provided in the blank chromatogram data. Input unit 32 determines whether the chromatogram data is actual-measured chromatogram data or the blank chromatogram data by determining the flag added to the chromatogram data. Input unit 32 transmits the actually-measured chromatogram data to extraction unit 34 and transmits the blank chromatogram data to noise generation unit 38.

Extraction unit 34 extracts the peak having a good waveform shape in the actually-measured chromatogram. As a specific method, for example, extraction unit 34 removes a prescribed peak from the actually-measured chromatogram data. For example, the prescribed peak includes a peak having an extremely low SN ratio and a peak having insufficient separation. Then, extraction unit 34 calculates a shape parameter (hereinafter, also referred to as a "peak parameter") related to the extracted peak. For example, the peak parameter includes at least one of a tailing degree, a leading degree, a peak width, and a signal noise ratio (SN ratio).

Further, extraction unit 34 calculates not only the peak parameter but also the chromatogram parameter. The chromatogram parameters include the number of peaks in the chromatogram, the position of the peak near a center of the time axis of the waveform, and the distance between adjacent peaks. The chromatogram parameters are utilized to position the peak in the chromatogram waveform.

As described above, extraction unit 34 outputs the extracted peak parameter and chromatogram parameter as authentic peak waveforms to GAN execution unit 36. In addition, extraction unit 34 may extract the peak from the actually-measured chromatogram data based on current estimation model 121A. GAN execution unit 36 executes processing by a generative adversarial network (GAN). For example, a technique of the GAN is disclosed in WO 2021/261202. Specifically, GAN execution unit 36 updates a generator 41 that generates the pseudo peak waveform. GAN execution unit 36 transmits information about generator 41 (for example, updated parameter). Accordingly, generator 41 of GAN execution unit 36 and generator 41 of update unit 40 are the same. Details of the processing of GAN execution unit 36 will be described later. The pseudo peak waveform is used for the training of estimation model 121.

In addition, noise generation unit 38 generates and acquires the pseudo noise waveform (see FIGS. 4 and 5 described above) based on the blank chromatogram data from input unit 32. At this point, the pseudo noise waveform is used for the training of estimation model 121. The processing of noise generation unit 38 will be described later.

Update unit 40 prepares the pseudo peak (see FIG. 3(B)). Then, update unit 40 generates the pseudo chromatogram by adding the pseudo peak and the pseudo noise generated by noise generation unit 38. Then, training device 30 updates estimation model 121A using the pseudo chromatogram as the training data and the pseudo peak as the training data. Estimation model 121A is stored in a storage 52 (see FIG. 7). Update unit 40 transmits updated estimation model 121A to data analysis device 25. Data analysis device 25 updates estimation model 121 stored in model storage 114 to estimation model 121A transmitted from training device 30. Accordingly, estimation model 121 and estimation model 121A are synchronized with each other. When a configuration in which data analysis device 25 and training device 30 are integrated is adopted, update unit 40 updates estimation model 121.

Figure 7:
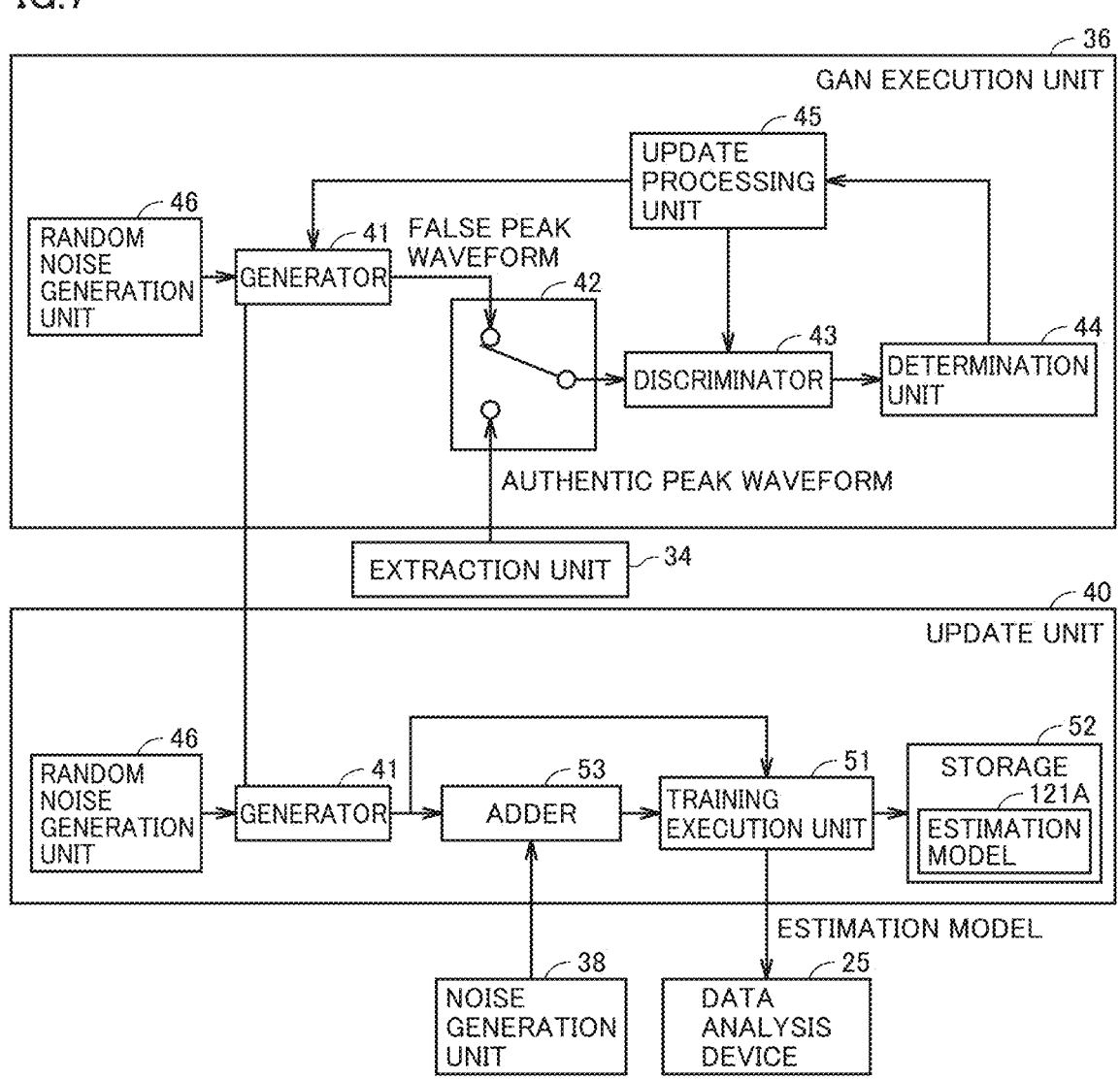
FIG. 7 is a functional block diagram illustrating a GAN execution unit and an update unit.

FIG. 7 is a functional block diagram illustrating GAN execution unit 36 and update unit 40. GAN execution unit 36 includes a random noise generation unit 46, a generator 41, a data selection unit 42, a discriminator 43, a determination unit 44, and an update processing unit 45. A prescribed neural network is used as generator 41 and discriminator 43. For example, the prescribed neural network is disclosed in the following Documents 1 and 2.

Document 1 is Alec Radford, and two others, "Unsupervised Representation Learning with Deep Convolutional Generative Adversarial Networks", [online], searched on Jan. 26, 2022, the Internet <URL: https://arxiv.org/abs/1511.06434>.

Document 2 is Ian J. Goodfellow, and seven others, "Generative Adversarial Nets", [online], [searched on Jan. 26, 2022], the Internet <URL: https://arxiv.org/pdf/1406.2661.pdf>.

Random noise generation unit 46 randomly generates the noise and outputs the noise to generator 41. Furthermore, the data of the authentic peak waveform transmitted from extraction unit 34 is input to data selection unit 42.

Generator 41 prepares a function based on the noise from random noise generation unit 46 and the neural network. The function uses time (passage of time) as an argument and outputs the data of a false peak waveform. Generator 41 generates the data of the false peak waveform by inputting time (passage of time) to the prepared function. In addition, the number of data points of the false peak waveform is the same as the number of data points of the authentic peak waveform output from extraction unit 34.

Data selection unit 42 alternately switches between the false peak waveform data and the authentic peak waveform data, and inputs the data to the discriminator 43. Discriminator 43 identifies whether the input waveform data is authentic. Discriminator 43 outputs a discrimination result to determination unit 44. Determination unit 44 determines whether the discrimination result is correct. That is, the determination is a determination made by discriminator 43 to check whether the data is identified as authentic when the authentic peak waveform data is input to discriminator 43 and whether the data is identified as false when the false peak waveform data is input to discriminator 43.

Update processing unit 45 updates the parameters (coefficients) of the neural network such that the performance of each of generator 41 and discriminator 43 is improved based on the determination result by determination unit 44. As described above, in the GAN, the training is executed such that the performance of each of generator 41 and discriminator 43 is improved while generator 41 and discriminator 43 are caused to compete with each other. Specifically, update processing unit 45 updates the parameters of the neural network in generator 41 such that generator 41 generates a high-quality function. Here, the high-quality function is a function capable of generating the false peak waveform data as close as possible to the authentic peak waveform data.

With reference to FIG. 7, update unit 40 will be described below. Update unit 40 includes random noise generation unit 46, generator 41, an adder 53, a training execution unit 51, and storage 52. As described above, generator 41 of GAN execution unit 36 and generator 41 of update unit 40 are the same. In other words, generator 41 updated by update processing unit 45 of GAN execution unit 36 is also used by update unit 40. Random noise generation unit 46 of GAN execution unit 36 is also used in update unit 40.

As described above, random noise generation unit 46 randomly generates the noise and outputs the random noise to generator 41. Generator 41 generates the pseudo peak waveform. The pseudo peak waveform corresponds to the "peak waveform" of the present disclosure. As described above, the performance of generator 41 is improved by update processing unit 45. Accordingly, generator 41 can generate the pseudo peak waveform close to the authentic peak waveform. The generated pseudo peak waveform is output to adder 53 and training execution unit 51.

Adder 53 adds the pseudo peak waveform from generator 41 (see FIG. 3(B)) and the pseudo noise waveform from noise generation unit 38 (see FIG. 3(A)) to generate the pseudo chromatogram (see FIG. 3(C)). The pseudo chromatogram corresponds to the "signal waveform" of the present disclosure. The training execution unit 51 updates estimation model 121A with the pseudo chromatogram as the training data and the pseudo peak as the training data.

Then, training execution unit 51 transmits updated estimation model 121 A to data analysis device 25. Data analysis device 25 updates estimation model 121 to estimation model 121A.

Figure 8:
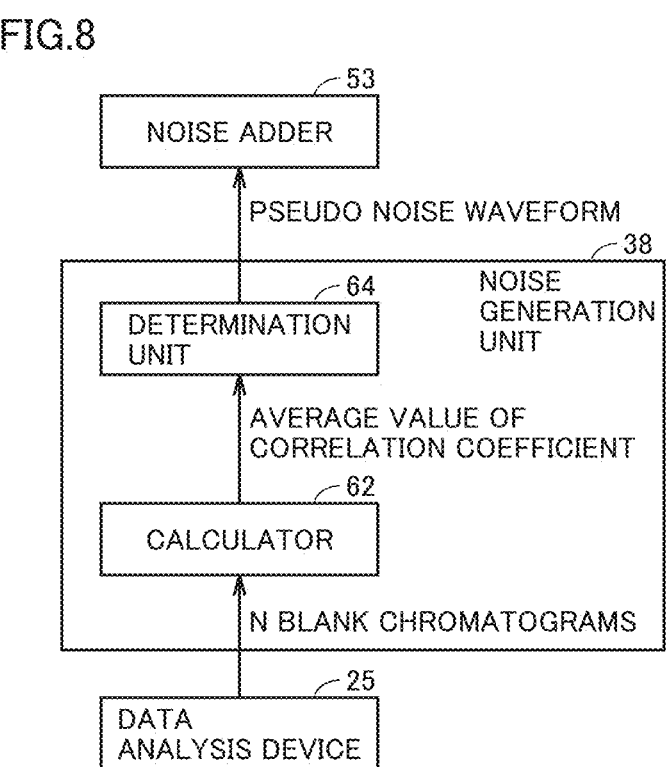
FIG. 8 is a functional block diagram illustrating a noise generation unit.

FIG. 8 is a functional block diagram illustrating noise generation unit 38. Noise generation unit 38 includes a calculator 62 and a determination unit 64.

As described above, in the training mode, the blank measurement is performed N times by the user. Data analysis device 25 prepares N blank chromatograms by the N blank measurements. Calculator 62 acquires the N blank chromatograms from data analysis device 25. Calculator 62 calculates the above-described L correlation coefficients using the N blank chromatograms. Furthermore, calculator

62 calculates an average value of the L correlation coefficients. The calculated average value is output to determination unit 64.

Determination unit 64 determines whether the average value is greater than or equal to the threshold. The case where the average value is less than the threshold is the case where the non-assumed noise waveform is not included in the blank chromatogram (FIG. 4). Accordingly, in this case, determination unit 64 acquires N blank chromatograms as the pseudo noise waveform. Then, determination unit 64 transmits the pseudo noise waveform to adder 53.

On the other hand, the case where the average value is greater than the threshold is the case where the non-assumed noise waveform is included in the blank chromatogram (FIG. 5). Therefore, in this case, determination unit 64 discards the N blank chromatograms.

As described above, sometimes analysis device 35 generates the chromatogram including the noise (assumed noise) that may be generated when sample S is analyzed. Therefore, as illustrated in FIG. 3, in the training mode, training device 30 generates the pseudo chromatogram by adding the pseudo noise simulating the assumed noise and the pseudo peak simulating the peak. Then, training device 30 updates estimation model 121 based on the pseudo peak and the pseudo chromatogram. As a result, the accuracy of the peak detection can be improved as compared with "the peak detection using the estimation model that does not reflect the assumed noise".

In addition, in the first embodiment, by executing the blank measurement N times, training device 30 generates the N blank chromatograms as the pseudo peak. At this point, when the foreign substance is mixed in measurement unit 10 or the like in the blank measurement, the waveform of the non-assumed noise is sometimes included in the blank chromatogram. For this reason, training device 30 calculates the average value of the L correlation coefficients for the N blank chromatograms. Then, when the average value is less than the threshold, training device 30 uses the N blank chromatograms as the pseudo noise waveform. On the other hand, when the average value is less than the threshold, training device 30 discards the N blank chromatograms. Accordingly, training device 30 can determine that the non-assumed noise waveform is included in the pseudo noise waveform, and execute the processing according to the non-assumed noise waveform. In addition, training device 30 automatically excludes the pseudo noise waveform including the non-assumed noise waveform. Accordingly, degradation of the quality of estimation model 121 can be prevented without imposing a burden on the user.

The assumed noise waveform is generated by performing the blank measurement with no use of sample S. Accordingly, training device 30 can generate the assumed noise waveform without consuming sample S.

The similarity degree is "the average value of correlation coefficients (L correlation coefficients) of the N pseudo noise waveforms". Accordingly, training device 30 can determine whether the non-assumed noise waveform is included in the pseudo noise waveform using the known parameter called the correlation coefficient.

Training device 30 acquires the pseudo peak waveform by the GAN. Accordingly, the pseudo peak waveform close to the authentic peak waveform can be acquired, so that the quality of the pseudo peak waveform can be improved.

[Flowchart]

Figure 9:
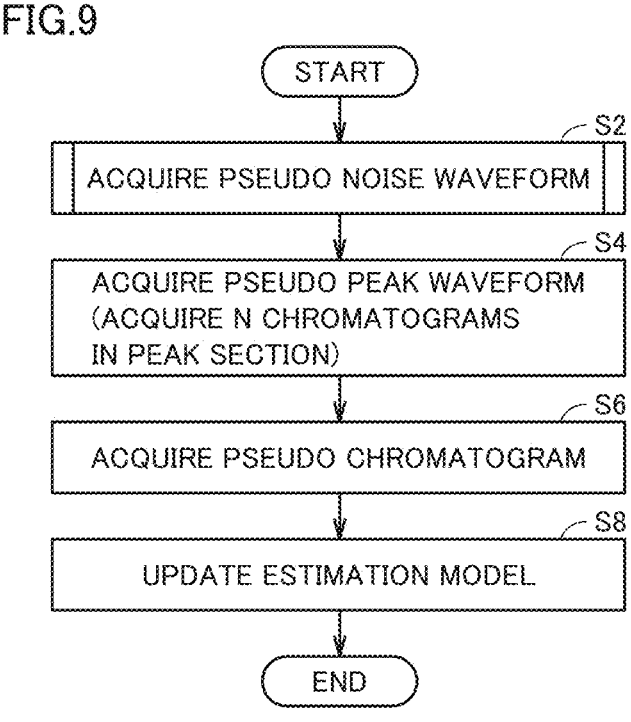
FIG. 9 is a flowchart illustrating a processing procedure of the analysis system.

FIG. 9 is a flowchart illustrating the processing of analysis system 100 including training device 30. In step S2, training device 30 generates and acquires the pseudo noise waveform. In step S4, training device 30 generates and acquires the pseudo peak waveform. A parentheses in step S4 will be described in a second embodiment. In step S6, training device 30 generates and acquires the pseudo chromatogram by adding the pseudo noise waveform and the pseudo peak waveform. In step S8, training device 30 updates estimation model 121A (estimation model 121) based on the pseudo peak waveform and the pseudo chromatogram.

Figure 10:
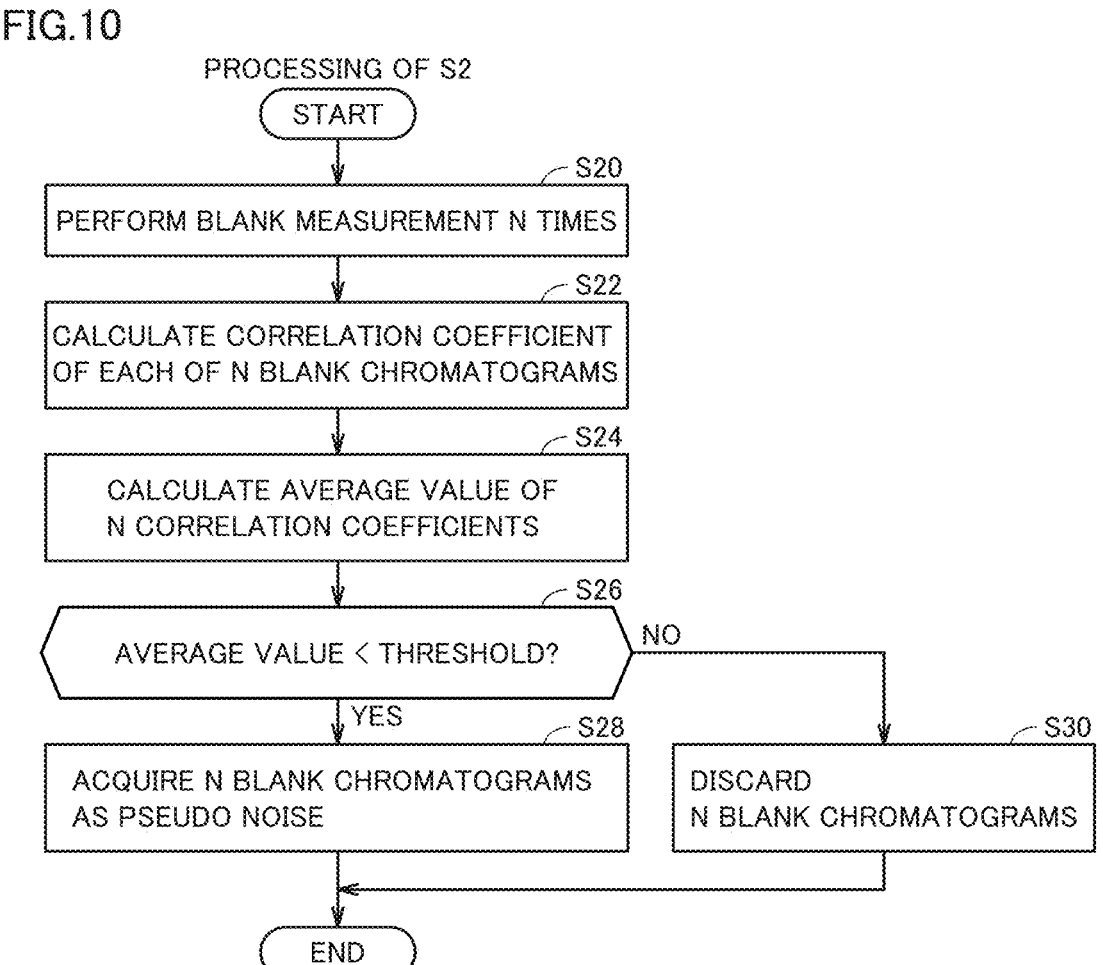
FIG. 10 is a flowchart illustrating processing in step S2.

FIG. 10 is a flowchart illustrating the processing in step S2. In step S20, measurement unit 10 performs the blank measurement N times. In step S22, training device 30 calculates the correlation coefficients (L correlation coefficients) of the N blank chromatograms obtained by the N blank measurements. In step S24, training device 30 calculates the average value of the L correlation coefficients.

In step S26, training device 30 determines whether the average value is less than the threshold. When the average value is less than the threshold (the case of the affirmative determination in step S26), namely, when the non-assumed noise is not included in the blank chromatogram, training device 30 acquires the N blank chromatograms as the pseudo noise. Then, training device 30 transmits the pseudo noise (N blank chromatograms) to adder 53.

On the other hand, when the average value is greater than or equal to the threshold (the case of negative determination in step S26), namely, when the non-assumed noise is included in the blank chromatogram, training device 30 discards the N blank chromatograms.

Second Embodiment

In the first embodiment, the configuration in which training device 30 acquires the pseudo noise by the blank measurement has been described. In a second embodiment, the sample is disposed in disposition unit 18, and prescribed measurement is performed on the sample, whereby training device 30 acquires the pseudo noise. The sample may be the known sample in which the compound is known or the unknown sample in which the compound is unknown.

Here, in the case where the signal waveform generated by analysis device 35 is represented two-dimensionally, an axis (X-axis) in the first direction is represented by a section, and an axis (Y-axis) in the second direction is represented by intensity. In the second embodiment, the section represented by the axis in the first direction includes a first section and a second section. The prescribed measurement is a measurement in which the peak (hereinafter, also referred to as an "actual peak") based on the sample is generated in the first section of the signal waveform while no peak is detected in the second section different from the first section. In the second section, an assumed noise (hereinafter, also referred to as an "actual noise") is detected.

When the analyzer is the chromatograph, the signal waveform is the chromatogram, the first section is a first time period, and the second section is a second time period. When the analysis device is another device (for example, the X-ray analyzer), the signal waveform is the X-ray spectrum waveform, the first section is a first energy band, and the second section is a second energy band. The first time period (first section) is also referred to as a peak section, and the second time period (second section) is also referred to as a non-peak section. In the second embodiment, training device 30 updates estimation model 121 with the actual peak waveform as the pseudo peak waveform and the actual noise waveform as the pseudo noise waveform. As a modification, training device 30 may update estimation model 121 based on only the actual peak waveform. Furthermore, as a modification, training device 30 may update estimation model 121 based on only the actual noise waveform.

For example, the prescribed measurement is measurement (hereinafter, also referred to as "multiple reaction monitoring (MRM) measurement") in an MRM mode. The MRM is a method in which a specific ion (precursor ion) is selected from various ions ionized by the ionization probe by the first-stage mass spectrometry unit, the precursor ion is dissociated by the collision cell, and a specific ion is detected from among the broken ions (product ions) by the second-stage mass spectrometry unit. The compound is defined by a compound number. The prescribed measurement may be another measurement, for example, a scan measurement. The prescribed measurement corresponds to the "noise measurement" of the present disclosure.

Figure 11:
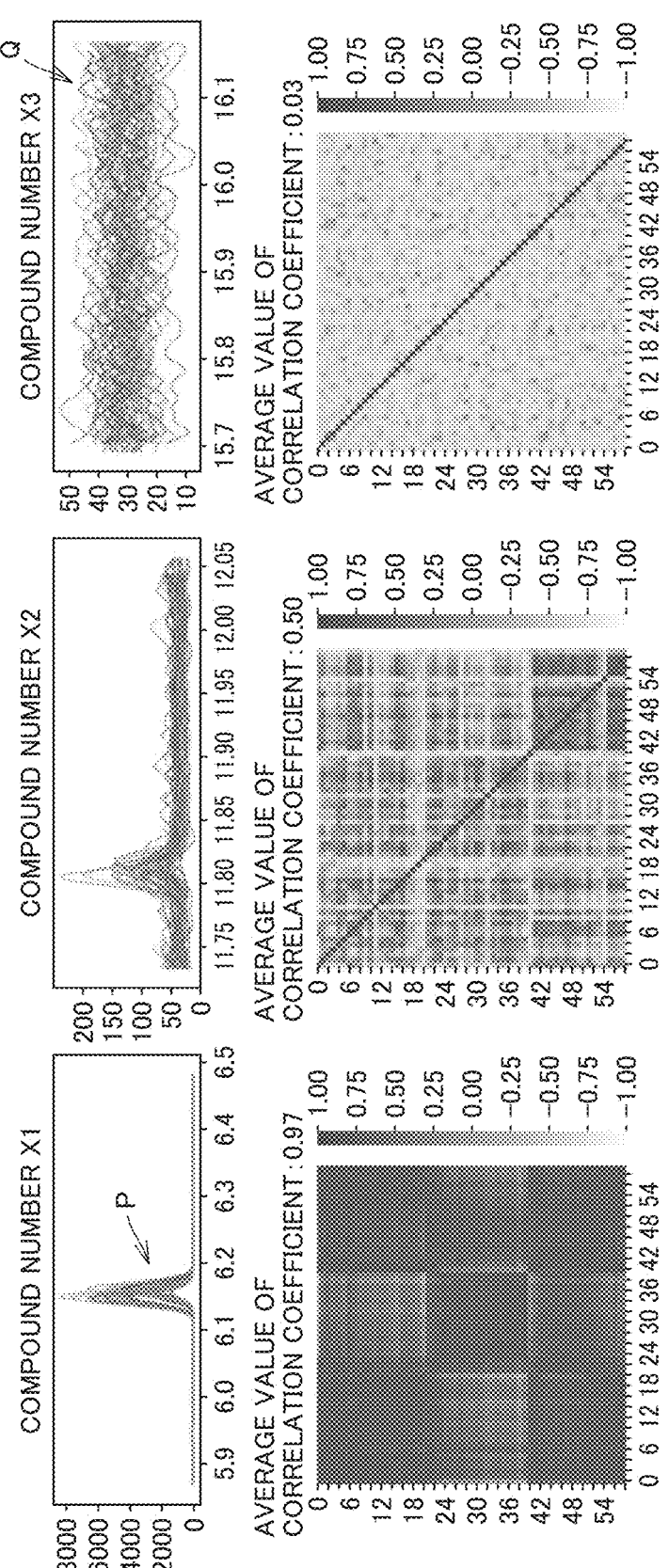
FIG. 11 is a view illustrating an example of a result of prescribed measurement.

FIG. 11 is a view illustrating an example of a result of the prescribed measurement. In the example of FIG. 11, a compound number X1, a compound number X2, and a compound number X3 are illustrated as the numbers of the compounds identifiable by the MRM measurement.

In the example of FIG. 11, the compound corresponding to compound number X1 is detected by the peak in the time period of 5.9 to 6.5. In addition, the compound corresponding to compound number X2 is detected by the peak in the time period of 11.75 to 12.05. In addition, the compound corresponding to compound number X3 is detected by the peak in the time zone of 15.7 to 16.1.

In addition, because the sample measured by the prescribed measurement is the known sample, the first time period (time period in which the actual peak is generated) and the second time period (time period in which the actual peak is not generated but the actual noise is generated) are determined. In the example of FIG. 11, the first section corresponds to the time period of 5.9 to 6.5 (time period corresponding to compound number X1). The second section corresponds to the time period of 15.7 to 16.1 (time period corresponding to compound number X3). An actual peak P is detected In the first section. An actual noise Q is detected in the second section.

In addition, training device 30 calculates the average value of the correlation coefficients of the N chromatograms acquired by the N prescribed measurements in the second time period. The second time period is a time period in which the peak due to the known sample is generated. When the average value is less than the threshold, training device 30 determines that the non-assumed noise is not generated. Accordingly, training device 30 acquires the chromatogram of the second time period as the pseudo waveform noise. On the other hand, when the average value is greater than or equal to the threshold, training device 30 determines that non-assumed noise is generated. Accordingly, training device 30 discards the pseudo waveform noise from the chromatogram of the second time period.

Figure 12:
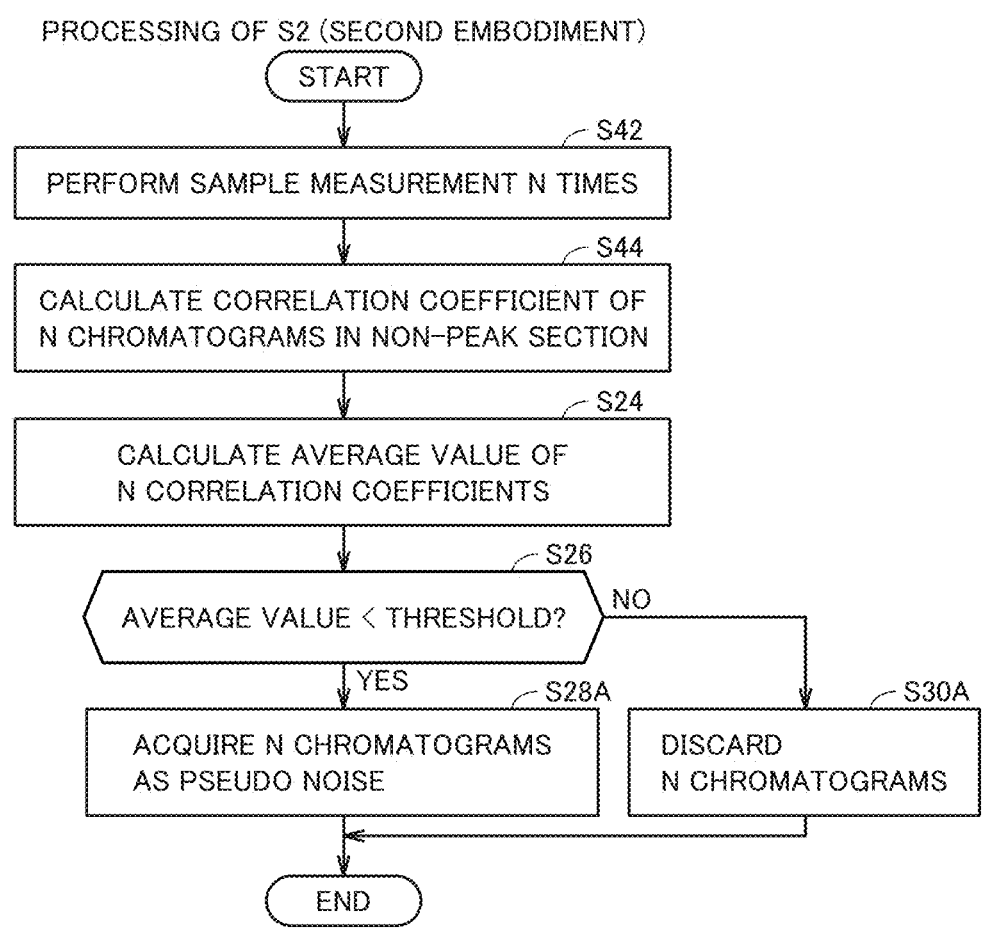
FIG. 12 is a flowchart illustrating processing in step S2 according to a second embodiment.

FIG. 12 is a flowchart illustrating the processing in step S2 of the second embodiment. In addition, the flowchart in FIG. 9 is adopted as the training method of the second embodiment. In the second embodiment, the parentheses processing in step S4 is performed.

In step S42 of FIG. 12, measurement unit 10 performs the sample measurement (the measurement of the known sample) N times. In step S44, training device 30 calculates the correlation coefficients of the N chromatograms in the non-peak section. Next, training device 30 executes the processing of step S24 and subsequent steps.

In addition, when the processing of step S2 ends, training device 30 executes the processing of step S4. At this point, in step S4, training device 30 acquires the waveform of actual peak P in the first section as the authentic peak waveform (see FIG. 7).

According to the second embodiment, training device 30 acquires actual noise waveform Q generated in the second section as the pseudo noise waveform. Then, training device 30 calculates the average value of the correlation coefficients of N actual noise waveforms Q (step S24 in FIG. 12). In step S26, training device 30 determines whether the average value is less than the threshold. When the affirmative determination is made in step S26, the N chromatograms acquired in step S42 are acquired as the pseudo noise waveforms in step S28A. On the other hand, when the negative determination is made in step S26, the N chromatograms are discarded in step S30A. In this manner, training device 30 determines whether the non-assumed noise waveform is included in the pseudo noise waveform based on the average value. Accordingly, training device 30 can generate the pseudo noise waveform in the same situation as the case of analyzing the sample. Consequently, the quality of the pseudo noise waveform can be improved.

In addition, training device 30 acquires an actual peak waveform P as the pseudo peak waveform. Accordingly, training device 30 can effectively use the actual peak waveform that can be acquired together with the actual noise waveform.

Third Embodiment

In the first embodiment or the second embodiment, the configuration in which training device 30 automatically discards the N blank chromatograms has been described when the average value is greater than or equal to the threshold in step S26 of FIG. 10 or FIG. 12 (NO in step S26). However, when the average value is greater than or equal to the threshold (NO in step S26), training device 30 may notify the user that the similarity degree (the average value of the correlation coefficients) is greater than or equal to the threshold. For example, this notification is implemented by displaying a prescribed image on display device 65.

Figure 13:
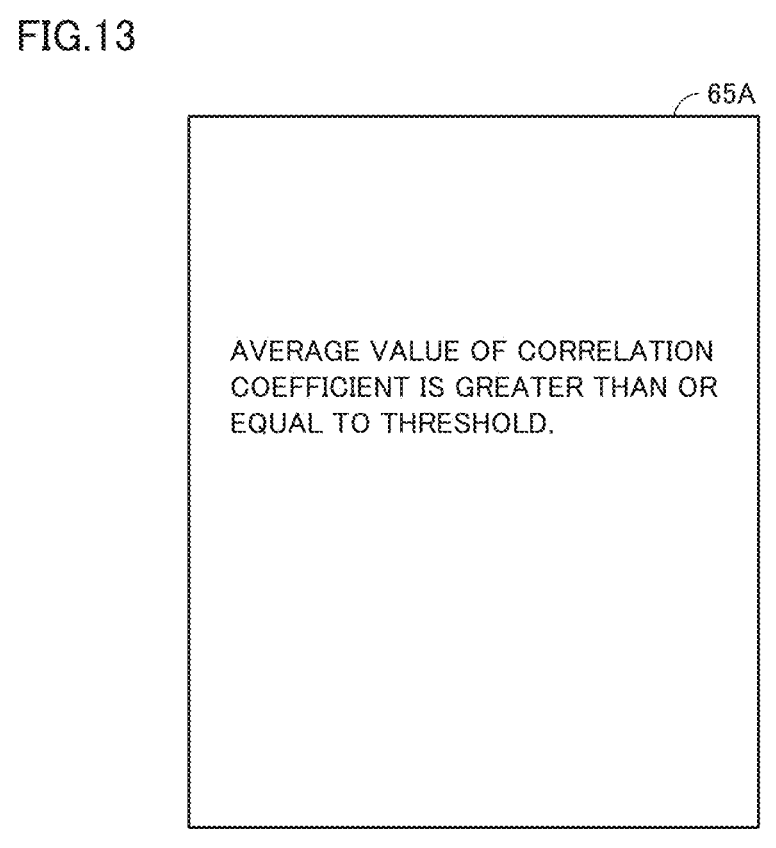

FIG. 13 illustrates an example of the prescribed image. FIG. 13 illustrates an example in which the prescribed image is displayed in a display region 62A of display device 65. In the example of FIG. 13, the prescribed image with the words "average value of correlation coefficient is greater than or equal to threshold." is displayed. By displaying the prescribed image by training device 30, the user can be caused to recognize that the average value of the correlation coefficients is greater than or equal to the threshold, namely, that the pseudo noise waveform includes the non-assumed noise waveform. Accordingly, the user can exclude the pseudo noise waveform by inputting a prescribed command to input device 61 (manually input of the user). In addition, the user can visually recognize the pseudo noise waveform including the non-assumed noise.

ASPECTS

It is understood by those skilled in the art that the plurality of embodiments described above are specific examples of the following aspects.

(Clause 1) A training method according to one aspect is a training method for performing training of an estimation model used to detect a peak of a signal waveform output by an analysis device that analyzes a sample. The training method includes acquiring a noise waveform that may be generated when an analysis device executes analysis processing and training the estimation model based on the noise waveform. The acquiring the noise waveform includes: acquiring a plurality of noise waveforms by noise measurement executed a plurality of times by the analysis device; calculating a similarity degree of the plurality of noise waveforms; and executing prescribed processing according to the similarity degree.

According to such a configuration, it can be determined that an unintended noise waveform is included in the noise waveform, and processing according to the noise can be executed.

(Clause 2) The training method described in clause 1, in which executing the prescribed process includes acquiring a plurality of noise waveforms having a similarity degree less than a threshold. The prescribed processing includes processing for discarding a plurality of noise waveforms having a similarity degree greater than or equal to a threshold.

According to such the configuration, the noise waveform including an unintended noise waveform can be automatically excluded. Accordingly, degradation of quality of the estimation model can be prevented without imposing a burden on the user.

(Clause 3) The training method described in clause 1 or 2, in which the prescribed processing includes processing for notifying the user that the similarity degree is greater than or equal to the threshold.

According to such the configuration, the user can be caused to recognize that the similarity degree is greater than or equal to the threshold.

(Clause 4) The training method described in any one of clauses 1 to 3, in which the noise measurement is measurement analyzed by the analysis device while the sample is not disposed in the analysis device.

According to such the configuration, the noise waveform can be generated without consuming the sample.

(Clause 5) The training method described in any one of clauses 1 to 3, in which the noise measurement is measurement in which an actual peak waveform is generated in a first section of a signal waveform by the analysis device analyzing a known sample in which a compound is known. The acquiring the noise waveform includes acquiring an actual noise waveform generated in the second section in which the actual peak is not detected as the noise waveform.

According to such the configuration, the noise waveform can be generated in the same situation as the case of analyzing the sample. Accordingly, the quality of the noise waveform can be improved.

(Clause 6) The training method described in clause 5, in which the training the estimation model includes training the estimation model based on the actual peak waveform and the noise waveform.

According to such the configuration, the actual peak waveform that can be acquired together with the actual noise waveform can be effectively utilized.

(Clause 7) The training method described in any one of clauses 1 to 6, in which the similarity degree is an average value of correlation coefficients between the plurality of noise waveforms.

According to such the configuration, whether an unintended noise waveform is included in the acquired noise waveform can be determined using a known parameter called the correlation coefficient.

(Clause 8) The training method described in any one of clauses 1 to 7 further includes: acquiring a peak waveform that does not include the noise waveform; and generating a signal waveform by adding the noise waveform and the peak waveform, in which the training the estimation model includes training the estimation model based on the signal waveform.

According to such the configuration, the estimation model in the same situation (situation in which the signal waveform is generated) as the situation generated in the case of analyzing the unknown sample can be trained.

(Clause 9) The training method described in clause 8, in which the peak waveform is acquired by a generative adversarial network.

According to such the configuration, quality of the peak waveform can be improved.

(Clause 10) A training program according to an aspect is a training program that causes a computer to update an estimation model used to detect a peak of a signal waveform output by an analysis device that analyzes a sample. The training program causes a computer to execute acquiring a noise waveform that may be generated when an analysis device executes analysis processing and training an estimation model based on the noise waveform. The acquiring the noise waveform includes: acquiring a plurality of noise waveforms by noise measurement executed a plurality of times by the analysis device; calculating a similarity degree of the plurality of noise waveforms; and executing prescribed processing according to the similarity degree.

For the above-described embodiments and modifications, it is planned from the beginning of the application to appropriately combine the configurations described in the embodiments within a range in which no inconvenience or contradiction occurs including combinations not mentioned in the specification.

Although the embodiments of the present invention has been described, it should be considered that the disclosed embodiment is an example in all respects and not restrictive. The scope of the present invention is indicated by the claims, and it is intended that all modifications within the meaning and scope of the claims are included in the present invention.

What is claimed is:

1. A training method for training an estimation model used to detect a peak of a signal waveform output by an analysis device that analyzes a sample, the training method comprising:

acquiring a noise waveform that may be generated when the analysis device executes analysis processing; and training the estimation model based on the noise waveform, wherein the acquiring the noise waveform includes:

acquiring first training data, wherein the first training data includes a first noise waveform and a second noise waveform generated by a noise measurement performed a plurality of times by the analysis device;

calculating a similarity degree between the first noise waveform and the second noise waveform; and executing a prescribed processing according to the similarity degree, wherein the prescribed processing includes generating second training data by removing the first noise waveform and the second noise waveform from the first training data when the similarity degree is equal to or greater than a threshold value, wherein the training the estimation model includes training the estimation model based on the second training data.

2. The training method according to claim 1, wherein the prescribed processing includes processing for notifying a user that the similarity degree is greater than or equal to the threshold value.

3. The training method according to claim 1, wherein the noise measurement is measurement analyzed by the analysis device while the sample is not disposed in the analysis device.

4. The training method according to claim 1, wherein the noise measurement is measurement in which an actual peak waveform is generated in a first section of a signal waveform by the analysis device analyzing a known sample in which a compound is known, and the acquiring the noise waveform includes acquiring an actual noise waveform generated in a second section in which the actual peak waveform is not detected as the noise waveform.

5. The training method according to claim 4, wherein the training the estimation model includes training the estimation model based on the actual peak waveform and the noise waveform.

6. The training method according to claim 1, wherein the similarity degree is value of correlation coefficient between the first noise waveform and the second noise waveform.

7. The training method according to claim 1, further comprising:

acquiring a peak waveform that does not include the noise waveform; and generating a signal waveform by adding the noise waveform and the peak waveform, wherein the training the estimation model includes training the estimation model based on the signal waveform.

8. The training method according to claim 7, wherein the peak waveform is acquired by a generative adversarial network.

* * * * *